Figure 1:
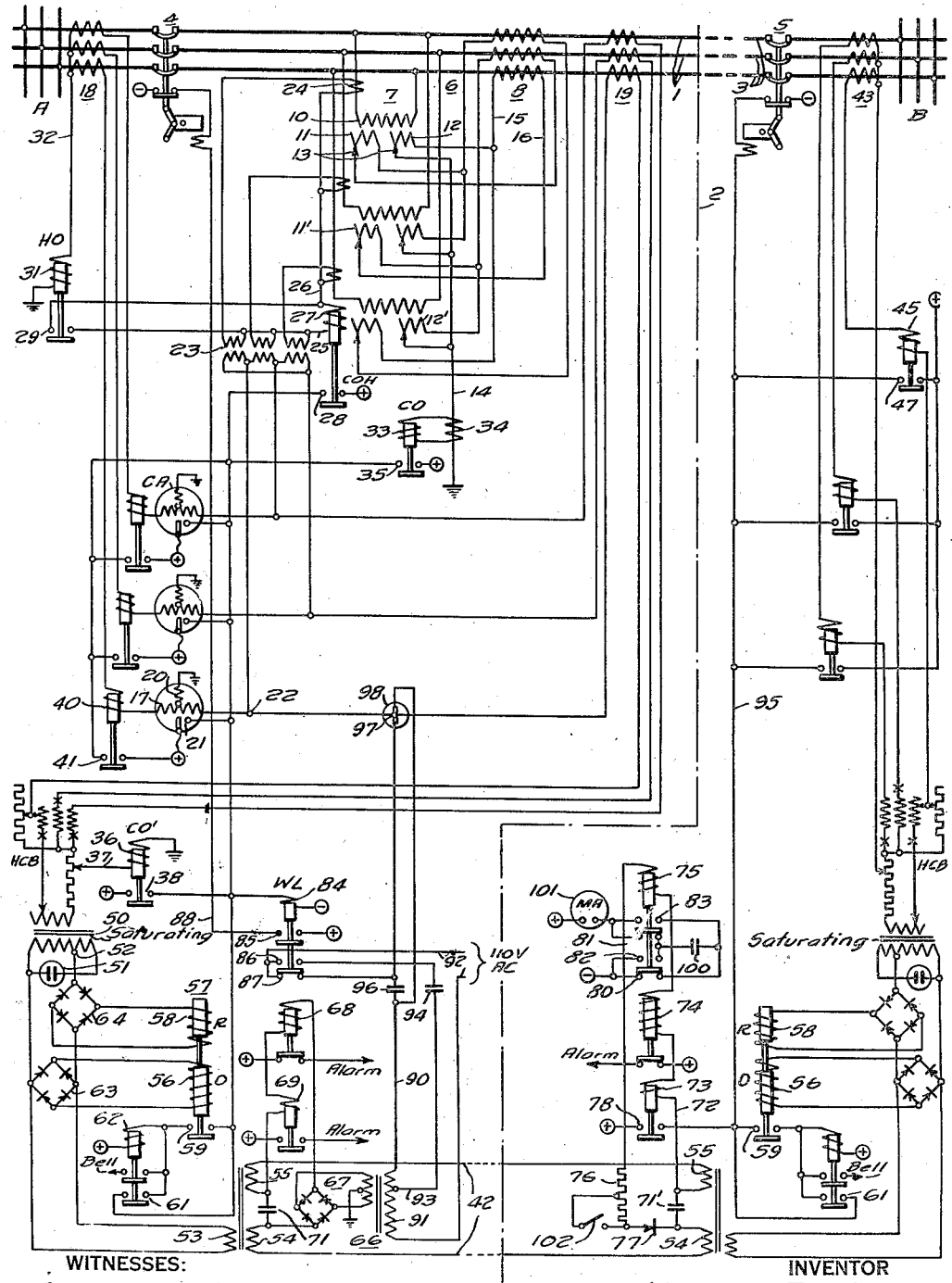

Patented May 22, 1945

2,376,752

UNITED STATES PATENT OFFICE 2,376,752

PILOT RELAYING SYSTEM

Myron A. Bostwick, Budd Lake, N. J., assignor to Westinghouse Electric & Manufacturing Company, East Pittsburgh, Pa., a corporation of Pennsylvania Application July 19, 1940, Serial No. 346,319

19 Claims. (Cl. 177—311)

My invention relates to pilot relaying systems, and it has particular relation to a protective relaying system utilizing a pilot-channel for obtaining a current from some other point in an electrical transmission line for assisting in protecting a section of a transmission line against internal faults while normally avoiding a line-opening operation in the event of a transmission-line fault occurring beyond said other point. By the term "pilot-channel," I refer to any signalling or communicating channel which may be either pilot wires or a carrier-current channel, particularly in a system in which the line-currents at the two ends of the protected line-section are totalized or compared by means of the pilot-channel in order to detect the presence of internal line-faults.

One of the objects of my invention is to combine, with such a current-comparing pilot-channel system, an additional means for transmitting a distinctive intelligence-communicating signal or current-change over the pilot-channel for the purpose of transmitting intelligence of any kind, such as metering, signalling, remote-control, or the like, but more particularly and specifically for the purpose of transmitting a remote tripping-impulse from the first end of the line-section to the second end, in transmission systems in which it is difficult, or impossible, at the second end, to reliably detect certain kinds of faults at the first end.

A further object of my invention is to provide a protective relaying-system for an alternating-current line, utilizing a signalling channel between two spaced points in the line, for protecting the line against internal faults between said two spaced points while normally avoiding a response to faults occurring elsewhere on the line, in combination with a particular external-fault-responsive relaying-means which is responsive to faults outside of the signalling-channel-protected portion between the aforesaid two spaced points, and means responsive to said particular external-fault-responsive relaying-means for performing such an operation, on the signalling-channel means, as to effect, at times, a relaying response of the signalling-channel means. Such an operation on the signalling-channel means may be either an open-circuiting operation or a short-circuiting operation on the signalling channel, according as the signalling channel operates on the circulating-current or the opposed-voltage principle, so as to utilize the line-current at the other end of the signalling channel as the fault-responsive means; or said operation on the signalling-channel means may consist in the transmission of a distinctive intelligence-communicating current-change over the signalling channel for the purpose of effecting a desired relaying-response at the other end of the channel.

A more specific object of my invention relates to pilot-wire systems, and involves a modification of the usual supervisory system utilizing small circulating direct currents and sensitive direct-current relays for detecting pilot-wire faults, such as a short-circuit, a grounded wire, or a broken wire. According to this phase of my invention, means are provided for, at times, producing a predetermined change or changes in the magnitude of the circulating supervisory current, for the purpose of transmitting the tripping-impulse, or other intelligence, from one end of the pilot wire to the other.

The need for my remote-tripping auxiliary to a current-comparing pilot-channel system is felt in several types of transmission systems in which there are circumstances which prevent the perfect or complete operation of the pilot relaying system which relies upon a comparison of the line-currents at the two ends of the protected line-section. For example, an interconnecting transmission line between two different transmission systems, or between two different portions of a transmission ring or loop, may include a large phase-shifting transformer, or power-flow control-unit, at one end, whereby the magnitudes and the phases of the line-voltages and currents may be different at the two ends of such a transmission line. In such a case, because of the possible shift in phase-angle of the line-current, which may amount to as much as 25°, it is often impossible or impracticable to include the phase-shifting units in the portion of the transmission line which is protected by the current-comparing pilot-channel, and some of the fault-currents in the phase-shifting units are too small to be detected by the pilot-channel relays even if said units were included in that portion of the line which is protected by the pilot-channel. Yet it is necessary to segregate both sides of the power-flow unit in case of an internal fault within said unit, that is, it is necessary to open a circuit-breaker on both sides of such a power-flow unit in case of an internal fault therein.

In order to avoid the need of supplying an extra set of high-voltage circuit-breakers on the line-side of such a power-flow unit (in addition to the high-voltage circuit-breakers that are provided on the bus-side), my present invention utilizes sensitive internal-fault-responsive relays for responding to an internal fault in the power-flow unit, in combination with means for transmitting intelligence thereof to the far end of the protected transmission-line section, so that the circuit-breaker at the far end of the protected section may be tripped open, in response to an internal fault in the power-flow unit, notwithstanding the fact that the line-current-responsive protective relays at said far end cannot reliably detect such internal faults in the power-flow unit.

More generally speaking, the remote-tripping phase of my invention is of special value in the protection of any transmission-line section which includes a transformer-bank which it is desirable to protect by means of very sensitive differential or ground relays for responding to internal faults within the transformer-bank, in which case, according to my invention, a remote tripping-means is provided for operating the circuit-breaker at the far end of the protected line-section. Lines containing a delta-connected bank of transformers at one end can thus be protected against ground-faults by means of a current-comparing pilot-channel system in combination with a remote tripping-means in accordance with my invention, notwithstanding the fact that the delta transformer-bank blocks the flow of ground-current at its end of the line-section, in the event of a ground-fault on the protected line-section.

With the foregoing and other objects in view, my invention consists in the apparatus, combinations, circuits, systems and methods hereinafter described and claimed, and illustrated in the accompanying drawings, wherein—

Figure 2:
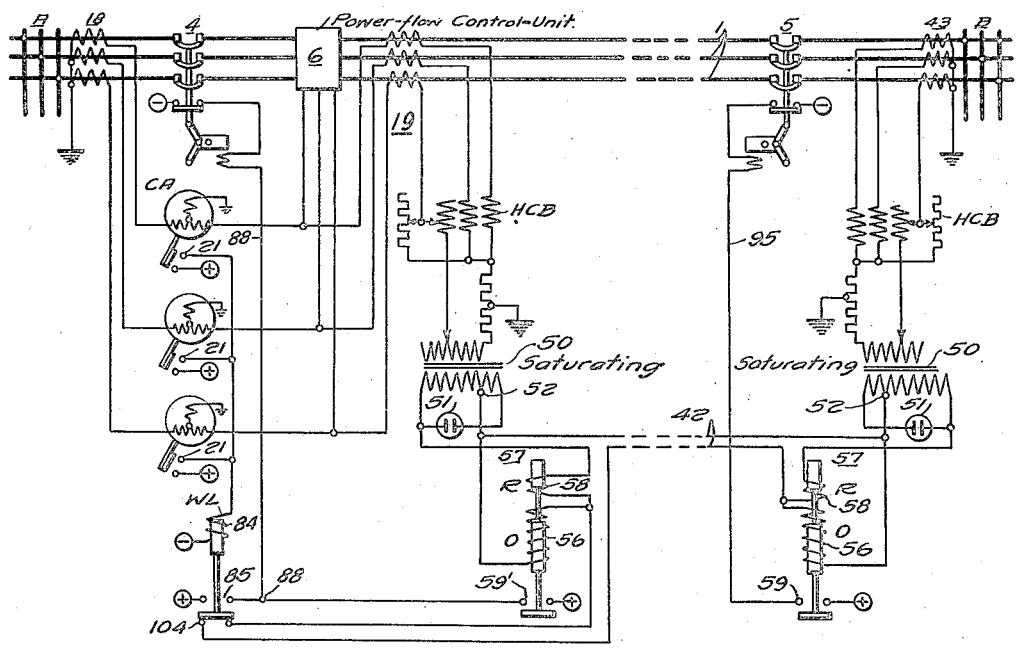
Figure 3:
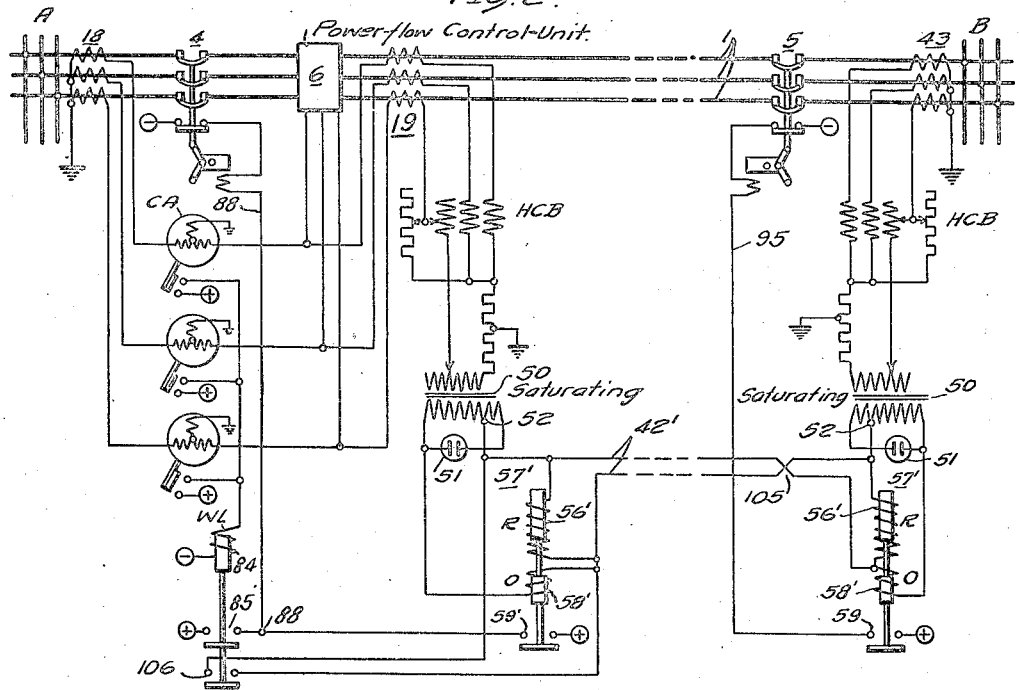

Figure 1 is a diagrammatic view illustrating my invention in an exemplary form of embodiment, and Figs. 2 and 3 are very much simplified diagrammatic views illustrating two different modifications.

In the system, represented in Figure 1, I show a three-phase transmission-line 1 which is connected between two distant stations A and B, the apparatus at the respective stations being separated, or distinguished on the diagram, by a dot-and-dash construction-line 2, and the idea of distance being indicated by a dotted-line section 3 in the transmission-line 1. The protected line-section 1 is provided with two line-segregating circuit-interrupting means or circuit-breakers 4 and 5, located at the respective ends or stations A and B.

In the illustrated system, I show a power-flow control-unit 6 disposed on the line-side of the circuit-breaker 4 at station A. This control-unit comprises a bank of three single-phase power-transformers 7 which are connected across the respective line-to-line phases of the transmission line 1, and a set of three power-flow current-transformers 8 which are connected in series-circuit relation in the respective phase-conductors of the line 1. Each of the power-transformers 7 comprises a primary winding 10 and two secondary windings 11 and 12, with tap-changing means 13 on each of the secondary windings. The three secondary windings 12 are connected, in star, to a grounded neutral circuit 14, and are each connected to one terminal, such as 15, of its corresponding phase of the secondary windings of the power-current transformers 8. The other terminal 16 of each of the respective secondary windings of the power-current transformers 8 is connected back to the neutral point 14 through two secondary windings 11' and 12' in the two other phases of the power-transformer bank 7, in such manner that the voltage in 11' is at right angles to the sum of the voltages in 12 and 12'. The voltages of 12 and 12' are adjusted in magnitude in order to adjust the magnitude of the voltage-difference between the two ends A and B of the protected line-section 1, while the voltage in 11' is adjusted to control the phase.

Internal faults in the power-flow unit 6 are detected, in a known manner, by a set of sensitive fault-detectors including three differential relays CA, comprising so-called "sum" or restraining coils 17 which are serially connected between the corresponding terminals of two sets of current-transformers 18 and 19 which are connected in the line 1 on opposite sides of the power-flow unit 6. The differential relays CA are also provided with so-called "difference" or operating coils 20 which are connected in shunt across the corresponding secondary windings of the current-transformers 18 and 19, so as to respond to the difference between the currents therein. Each of the CA relays is also provided with a make-contact 21. The terminals 22 of the "sum" coils 17, which are on the same side as the power-flow unit 6, are shunted by the secondary windings of a bank of auxiliary current-transformers 23, the primary windings of which are energized, in star, from a set of three star-connected auxiliary current-transformers 24 which are connected in the respective primary-winding circuits of the corresponding power-transformers 7.

The star-points or neutral return-circuits 25 and 26 of the star-connected current-transformers 23 and 24, respectively, are joined through the operating coil 27 of a sensitive, moderate-speed overcurrent relay COH which is adapted to close its make-contact 28 in something like six cycles, more or less, in response to zero-phase-sequence current-components or ground-currents in the auxiliary current-transformers 23 and 24. In order to prevent the sensitive ground-relay COH from erroneously operating in response to through-faults when there is a ground somewhere on the transmission system outside of the power-flow control-unit 6, the operating coil 27 of the COH relay is adapted to be short-circuited by the make-contacts 29 of an instantaneous overcurrent relay HO having an operating coil 31 which is connected in the star-point or neutral circuit 32 of the line-current transformers 18, said instantaneous relay HO having a much higher current-setting than the ground-fault detector COH, and a shorter operating-time, which may be of the order of one cycle, more or less.

Faults on the power-transformers 7 are also protected by a relay CO having an operating coil 33 which is energized from an auxiliary current-transformer 34 in the grounded neutral-circuit 14 of the secondary windings 12 is of the power-transformers 7. The relay CO is a relatively slow-speed relay which closes its make-contacts 35 in something like fifteen cycles, more or less, in response to ground-fault currents flowing in the neutral conductor 14. Ground-faults on the line 1 are also detected, at the station A, by means of another slow-speed relay CO', having an operating coil 36 which is included in the grounded neutral return-circuit 37 of the line-current transformers 19. The line-ground detector CO' is adapted to close its make-contacts 38 in something like fifteen cycles, more or less, in response to a ground-fault condition on the protected line-section. I have also shown three slow back-up relays having operating coils 40 which are connected in series with the respective "sum" coils 17 of the differential relays CA, and having make-contacts 41 which close sluggishly in response to a predetermined over-current, in order to afford back-up protection.

The illustrated protective system also includes a pilot-wire circuit 42 which is connected between the two stations A and B for the purpose of totalizing or comparing the line-currents at these two respective stations, or the relaying-quantities derived from these line-currents, as will be subsequently described, so as to be able to detect a difference, in these line-currents, such as would be produced by a fault on the protected line-section 1.

In order to be able to utilize a single pilot wire 42, that is, a single pair of conductors 42, to approximate a sufficiently equal sensitivity of response to all of the various combinations of single-phase faults, ground faults, phase-to-phase faults and three phase-faults on the protected line-section, I preferably, as shown, energize the respective ends of the pilot wire 42 from two phase-sequence networks HCB such as are described and claimed in a Harder Patent No. 2,183,646, dated December 19, 1939, and assigned to the Westinghouse Electric & Manufacturing Company. Each phase-sequence network HCB ordinarily responds, in predetermined, relatively adjustable proportions, to both the positive-phase-sequence component and the zero-phase-sequence component of the line-current supplied by its line-current transformers, while selectively excluding a negative-phase-sequence response, although, by a simple interchanging of two phase-conductors, the HCB network may be made to be responsive to the negative and zero phase-sequence quantities, which is desirable in some instances.

The phase-sequence network HCB at the station A is energized from the line-current transformers 19 which are connected in the line 1 on the line-side of the power-flow unit 6; while the phase-sequence network HCB at the station B is energized from a similar line-current transformer-bank 43 which is connected in series-circuit relation to the protected line-section at the said station B. The respective phases of the line-current transformers 43 at the station B are also connected in series with the operating coils 45 of a set of back-up relays having make-contacts 47, similar to the operating coils 40 and make-contacts 41 of the corresponding back-up relays at the station A.

The output of each phase-sequence relay HCB is supplied to a saturating transformer 50 which is loaded by means of a neon lamp 51 as described in my Patent No. 2,183,537, dated December 19, 1939, for the purpose of limiting the magnitude of the voltage which is derived by the HCB network in response to the line-current. The saturating transformer 50 and the neon lamp 51 not only cause the output-voltage of the network HCB to approximate a constant predetermined limiting-value under a predetermined range of line-fault severities, but also cause the wave-form of said voltage-output to be somewhat flat-topped at times, as under severe overloads.

The output-voltage or secondary voltage of each saturating transformer 50 is tapped off, at 52, and supplied to the primary winding 53 of an insulating transformer having a "split" secondary winding, or two equal secondary windings 54 and 55, which are connected to a terminal of the pilot wire 42.

Connected across the primary winding 53 of the insulating transformer at each end of the pilot wire 42, so as to be responsive to the pilot-wire voltage, is the 4000-turn operating coil, O or 56, of a line-fault-responsive relay 57, which also has a 500-turn restraining coil, R or 58, which is serially connected in series with the tapped output 52 of the saturating transformer 50 at that end of the pilot wire, the numbers of turns of the coils being indicated only by way of example. The line-fault-responsive relay 57, at each of the stations A and B, is provided with a make-contact 59 which is adapted to be sealed in, or bypassed, by a make-contact 61 of an auxiliary relay 62 having an operating coil in series with the fault-responsive relay-contact 59. The fault-responsive relay 57 responds to line-frequency currents, but it may, as shown, nevertheless be a sensitive direct-current relay having its respective coils 56 and 58 energized through full-wave rectifiers 63 and 64, respectively.

In connection with the pilot wire or circuit 42, my present invention, in the form of embodiment illustrated in Fig. 1, utilizes an adaptation of, or addition to, a pilot-wire supervisory system such as is described and claimed in my pending application Serial No. 278,845, filed June 13, 1939, patented March 10, 1942, Patent No. 2,276,150, which, in turn, is an improvement over the pilot-wire relaying-system described and claimed in a Harder Patent No. 1,953,108, dated April 3, 1934, and assigned to the Westinghouse Electric & Manufacturing Company.

The illustrated pilot-wire supervisory circuit of Fig. 1 comprises a unidirectional-voltage source at the station A, said source being illustrated as comprising a step-down transformer 66 and a full-wave rectifier 67. The direct-current terminals of the rectifier 67 are connected, through a serially connected undercurrent direct-current supervisory relay 68 and an overcurrent direct-current supervisory relay 69, to the inner terminals of the split secondary windings 54 and 55, said inner terminals being also connected by means of a moderately large capacitor 71 for affording a low-impedance bypass circuit for the line-frequency currents flowing in the pilot wire 42.

The supervisory pilot-wire circuit, at the receiving end of the pilot wire, or at station B, includes a bypassing capacitor 71' joining the inner ends of the split secondary windings 54 and 55 of the insulating transformer so as to provide an easy path for the line-frequency currents circulated by the pilot wire. The terminals of said bypassing capacitor 71', at the station B, are shunted by means of a supervisory direct-current circuit 72 which is illustrated as serially including a relatively insensitive overcurrent direct-current tripping-relay 73, which is inserted in accordance with my present invention, an undercurrent direct-current supervisory relay 74, which is sometimes omitted, a relatively sensitive overcurrent direct-current metering-relay 75 which is inserted in accordance with my present invention, a fairly large resistance 76, and a rectifier 77 which constitutes the particular subject-matter of a copending application of R. M. Smith and myself, Serial No. 356,136, filed September 10, 1940.

The tripping relay 73 is responsive to a moderately large predetermined increase in the supervisory or circulating direct current in the pilot wire 42, so as to close its make-contact 78.

The metering-relay 75 is illustrated in Fig. 1 as being more sensitive than the tripping relay 73, so that it responds to relatively small increases in the normal circulating supervisory direct current in the pilot wire 42, so as to be operative under conditions when the tripping-relay 73 is non-responsive, this discriminatory action being accomplished either by the greater sensitivity of the metering-relay 75 or its faster speed of operation, or by both expedients. When the metering-relay 75 responds, it opens two back-contacts 80 and 81 and closes two make-contacts 82 and 83, the purpose of which will be subsequently described.

In accordance with my present invention, the pilot-wire supervisory circuit at the station A is modified so as to secure both a tripping-response and a metering-response, either one or both of which may be utilized in accordance with my invention. These responses are obtained, in Fig. 1, by introducing an intelligence-communicating predetermined alteration in the magnitude of the direct current which is circulated in the pilot wire 42, originally for supervisory purposes only, but now utilized by me for the above-described additional purpose or purposes.

The particular means which is illustrated in Fig. 1 for producing a change in the magnitude of the circulating direct current in the pilot wire 42, for the purpose of sending a tripping-impulse from the station A, where the power-flow unit 6 is included, to the remote station B, comprises an auxiliary relay WL. This auxiliary relay WL has an operating coil 84 which is energized by the closure of any one of the fault-responsive relay-contacts 21, 28, 35, 38, 41 or 59, so as to respond to a fault-indication of the localized line-frequency fault-responsive relaying equipment at the station A. The auxiliary relay WL has two make-contacts 85 and 86, and one break-contact 87. The make-contact 85 is utilized as a tripping contact for energizing a trip-circuit 88 to trip the circuit-breaker 4 at said station A.

The back-contact 87 and the make-contact 86 of the local-fault-responsive relay WL are utilized to increase the magnitude of the supervisory direct current which is circulated in the pilot wire 42, by disconnecting a terminal-conductor 90 of the primary winding 91 of the transformer 66 from a 110-volt alternating-current source 92, and connecting in lieu thereof, an intermediate tap 93, which has the effect of increasing the secondary voltage of the transformer 66 and thus increasing the direct-current voltage which is supplied to the pilot wire by the rectifier 67.

In lieu of, or, as shown, in addition to, the tap-changing means just described, a capacitor 94 may be connected in the supply-circuit of the primary winding 91 in response to the operation of the localized fault-responsive tripping-relay WL. As shown in Fig. 1, said capacitor 94 is connected in series with the intermediate tap 93. The capacitance of the capacitor 94 is coordinated or properly chosen with respect to the reactance of the transformer 66 in such manner that said transformer-reactance is neutralized, in whole, or in part, by the capacitor 94, so as to increase the effective primary voltage which is applied to the primary winding 91 of the transformer 66.

The increase in the circulating direct current, which is brought about by a response of the localized tripping-relay WL at the station A, is utilized, at the remote end of the protected line-section 1, to pick up the tripping-relay 73 at the station B, thereby closing the relay-contact 78 which energizes the trip-circuit 95 of the circuit-breaker 5 at said station B. This tripping-circuit 95 may also be energized by the closure of the relay-contact 59 of the pilot-wire HCB relay 57 or by the closure of any one of the back-up protective-relay contacts 47.

In its broader aspects, my invention is not limited to a utilization of the intelligence-communicating predetermined alteration in the direct-current magnitude, for tripping purposes at the other end of the pilot wire, but said predetermined change in magnitude may be utilized for any remote-response purposes, according to any discriminating considerations, such as a simple response to predetermined changes in magnitude of the circulating direct current in the pilot wire 42. Furthermore, I may utilize a suitable change in the condition of the pilot-circuit, for effecting a remote-tripping response at the other end of the pilot-channel, as will be described hereinafter in connection with Figs. 2 and 3.

The general aspect of my invention in regard to general uses of the circulating direct current in the pilot wires is illustrated, in Fig. 1, by including a metering-response which is initiated, at the station A, by alternately connecting and disconnecting a capacitor 96 in series with the terminal-conductor 90 of the primary winding 91 of the transformer 66 which supplies the direct current through the rectifier 67. The metering-signal, which is sent over the pilot wire by the alteration of the effective capacitance of the capacitor 96, as by periodically short-circuiting the same, may be dependent upon either the rate of recurrence of the current-impulses which are thus transmitted, or it may be dependent upon the lengths of the impulses (or the percentage of the total time during which the impulse-currents are flowing), or in accordance with any other metering system.

The metering system which is illustrated in Fig. 1 is an embodiment of the metering system which is shown and claimed in an Oman Patent No. 2,078,680, dated April 27, 1937, and assigned to the Westinghouse Electric & Manufacturing Company. According to this system, as embodied in the system illustrated in my drawings, the capacitor 96 is periodically short-circuited by means of a rotating commutator 97, the speed of rotation of which is controlled by any metering device which is illustrated as simply an ammeter or current-responsive meter 98 which is connected in series with the "sum" coils 17 of one of the differential relays CA, so as to respond to the magnitude of one of the line-currents at the station A. The capacitor 96 may be similar to the capacitor 94, so that when it is short-circuited, the effective voltage applied to the primary winding 91 will be smaller than when the short-circuiting path 97 is opened, thus resulting in a periodic alteration of the magnitude of the direct-current circulated in the pilot wire 42, at a rate which is responsive to the magnitude of the current traversing the ammeter 98.

The direct-current pulsations constituting the metering-signal are received at the far end of the pilot wire 42, that is, at the station B, by the metering-relay 75, which alternately picks up and drops out in accordance with said metering-impulses. The metering-relay 75 operates as a current-reverser or commutator which charges a metering-capacitor 100 of a predetermined magnitude, first in one direction, and then in the other direction, from a constant-potential direct-current source which is represented schematically by the source-terminals (+) and (−), the charging and discharging current-impulses of the capacitor 100 being measured by a direct-current milliammeter 101 which may be utilized for indicating, recording, or relaying purposes. The current-changes to which the metering-relay 75 responds are of an intermediate value between the overcurrents to which the tripping-relay 73 responds and the undercurrents to which the pilot-wire supervisory relay 74 responds.

The intelligence-communicating predetermined alteration in the value of the circulating direct current in the pilot wire 42 may be brought about by any means which is effective for this purpose, and may be included anywhere in the circuit of said circulatory or supervisory direct current, either at the end of the pilot wire which contains the direct-current source, or at the receiving end of the pilot wire.

To indicate the general nature of my invention, I have also illustrated a hand-operated switch 102 (Fig. 1) which is utilized, at the receiver end B of the pilot wire 42, for the purpose of cutting out some or all of the supervisory-circuit resistance 76, thereby effecting a predetermined increase in the amount of the circulating current, which increase may be responded to, at the other end A of the pilot wire, by means of the overcurrent alarm-circuit relay 69 or by a special sensitive relay (not shown) which may be provided for discriminatory response to the current-increase which is brought about by a temporary closure of the hand-switch 102 at the station B.

The essential feature of the intelligence-communicating predetermined alteration of the magnitude of the circulating direct current is that it should be in some way distinctive or distinguishable from the increase in the magnitude of the supervisory direct current which occurs when the pilot-wire conductors 42 are short-circuited at some intermediate point in the length of the pilot wire. Since a short-circuited condition of the pilot wire would be indicated by a steady, continuous actuation of the overcurrent alarm-relay 69 at station A, intelligence can be transmitted from the other station B by a momentary actuation of the alarm-relay 69 or by any code of signals such as two short rings, or the like, thereby providing the necessary discrimination between an intelligence-communicating actuation of the alarm-relay 69 and a faulty-pilot-wire actuation thereof.

In the operation of the system shown in Fig. 1, it will be observed that the pilot wire 42 is, in effect, connected between the line-current transformers 19 and 43, so that it does not include, in its protection, the power-flow unit 6 at the station A. Any fault in the protected line-section 1, or in that portion of the transmission line which is included between the points of connection of said line-current transformers 19 and 43, is responded to, in the usual way, by the HCB pilot-wire relays 57 at both station A and station B, thus resulting in the closure of the relay-contacts 59 and the energization of the respective tripping-circuits 88 and 95 for the two circuit-breakers 4 and 5, the tripping-circuit 88 at station A being energized through the intermediary of the auxiliary relay WL as previously described. The portion of the transmission line between the two current-transformers 19 and 43 may be regarded as the protected section which is protected against internal faults by the pilot-channel and its associated apparatus, and a fault in the power-flow control-unit 6 may be regarded as being external of the protected line-section.

In the event of an internal fault in the power-flow control-unit 6 at station A (Fig. 1), one or more of the quick-acting local fault-responsive relays COH or CA at station A, or one of the slower-acting back-up relays, as previously described, will operate to provide a fault-indication at the station A, and this fault-indication is utilized, as previously described, to energize the auxiliary tripping relay WL which, in turn, energizes the tripping-circuit 88 for the circuit-breaker 4 at said station A. In accordance with my invention, any actuation of the auxiliary tripping-relay WL at the station A (Fig. 1) will also send out a tripping-impulse to station B, in the form of an increased magnitude of the circulatory direct-current flow in the pilot wire 42, thereby picking up the overcurrent tripping-relay 73 at said station B and thus directly energizing the trip-circuit 95 of the circuit-breaker 5 at said station B.

The concurrent use of the pilot-wire supervisory circuit as a remote-metering means, or as an intelligence-communicating medium for any other purpose, need not interfere with either the supervisory functions of the supervisory circuit, or the tripping-operation of the tripping-relay 73, provided that satisfactory discriminations are made in regard to the magnitude or direction of the current-changes and the relative sensitivities and speeds of response of the various supervisory-circuit relays.

The normal supervisory current which has been commonly utilized in pilot-wire systems, such as the pilot wire 42, has usually been of the order of from 1 to 3 milliamperes, or occasionally 4 milliamperes, direct current. The overcurrent alarm-relay 69 at the sending station A has heretofore normally been set to operate at 125% of the normal supervisory current, although the system could readily be adjusted to utilize a greater increase in the supervisory current to actuate the overcurrent relay 69 at station A. The undervoltage supervisory relays 68 and 74 at stations A and B, respectively, have heretofore been set to respond, by dropping out, when the supervisory current reduces to 75% of its normal value, although, here again, a larger reduction in the supervisory current could be utilized for actuating these relays. The intelligence-communicating changes which are utilized, in accordance with my present invention, to transmit intelligence over the supervisory circuits of the pilot wires, should preferably be set to operate on smaller changes in the supervisory current, so as to avoid interference with the supervisory functions of responding to faults on the pilot wire 42, and contrarily, to avoid being interfered with by pilot-wire faults.

It is noted that there is never any overcurrent supervisory relay, at the receiving end B of the pilot wire, corresponding to the supervisory overcurrent relay 69 at the sending end A, because the only possible effect of a pilot-wire fault, either open-circuit or short-circuit, will be to reduce the magnitude of the supervisory current which is received at the receiving end B. Hence there is no limit to the magnitude of the overcurrent-increase in the value of the supervisory current which may be utilized for intelligence-communicating purposes, such as tripping, metering, signalling, or remote relaying of any sort, so far as interference with the operation of the supervisory pilot-fault alarm-system at the receiving end B of the pilot wire is concerned.

At the sending end A (Fig. 1), if the overcurrent supervisory alarm-relay 69 is not to be operated, said relay must be set to respond to an overcurrent which is larger than the overcurrent utilized for intelligence-communication, and the supervisory pilot-wire circuit must be adjusted, with a sufficiently high resistance 76 at its receiving end, and a sufficiently high direct-current source at its sending end, so that the weakest short-circuit which may occur on the pilot wire will suffice to actuate the said overcurrent relay 69. As an alternative, if a temporary sounding of the alarm which is controlled by the overcurrent relay 69 may be tolerated, or if this relay may be dispensed with altogether, relying solely upon the undercurrent response 74 at the receiving station B to indicate a short-circuit condition of the pilot wire 42, the above-mentioned restriction or limitation as to the magnitude of the overcurrent intelligence-communicating impulse may be avoided.

In any event, the intelligence-communicating impulses must be of a magnitude and frequency small enough to avoid interference with the operation of the line-frequency-responsive HCB pilot-wire relays 57. This last-mentioned consideration, with HCB relays of sensitivities such as have been commonly utilized heretofore, would limit the intelligence-communicating impulses in the pilot wire to currents of the order of 6 milliamperes or less.

The auxiliary rectifier 77, which I have shown as being included in the supervisory circuit of the pilot wire 42, at the receiver-end B (Fig. 1), serves the function of reducing the supervisory current to an extremely low value, thus causing a dropping-out response of the undercurrent alarm-relays 68 and 74, in the event of accidental reversal of the pilot-wire connections, thus guarding against faulty operation of the pilot-wire HCB relays 57. If the type of rectifier 77 is one in which the forward-current resistance decreases appreciably, on overcurrents of the values such as are utilized in my invention, as would be the case if a high-voltage contact-rectifier were utilized for this purpose, the rectifier 77 would also perform the function of serving as a portion of the resistance 76—77 which is included in the supervisory direct-current circuit 72 at the receiver-end B, and the inherent drop in the rectifier-resistance, in response to said overcurrents, would serve the useful purpose of reducing the supervisory-circuit resistance which is effective during the transmission of overcurrent signals in accordance with my invention. The functions and combinations involving said auxiliary rectifier 77 constitute the subject-matter of the description and claims of the previously mentioned application of R. M. Smith and myself.

In Figs. 2 and 3, I have indicated modifications of one aspect of my present invention, in which a tripping-operation is effected, at the station B, in response to a fault in the power-flow control-unit 6 at the station A, by means of such an alteration in the pilot-wire circuit as to cancel the normal discriminatory blocking-effect of the pilot channel for faults on the station-A side of the current-transformers 8.

In Fig. 2, a circulating-current type of pilot-wire protective system is shown in its barest outlines, being substantially the same as that which is shown in Fig. 1, except that the WL relay 84 is provided with an extra back-contact 104 which is connected in series-circuit relation to the pilot-channel 42.

The normal pilot-channel operation, in Fig. 2, is the same as that which has been described for Fig. 1. In the event of a short-circuit in the power-flow control-unit 6, however, the fault-detecting devices therefor, as symbolized in Fig. 2 by the differential relays CA, will close one or more of their contacts 21 and energize the WL relay 84 which results in opening the back relay-contact 104 and thus open-circuiting the pilot-wire 42. Since the pilot-wire protective-means is one which normally circulates a restraining current over the pilot wires 42, the open-circuiting of the pilot wires, as a result of the opening of the relay-contact 104, makes it impossible for the pilot wire (while in such open-circuited condition) to restrain the operation of the pilot-wire relay 57 at the station B, so that this pilot-wire relay 57 at the station B will respond, provided that a line-current of more than relay-tripping value is fed through the line-current transformers 43 at the station B to the fault in the power-flow controlled-unit 6 at the station A.

In Fig. 3, by way of illustration, I show a pilot-wire protective-system of the balanced-voltage type, in which current is circulated through the pilot wires for the purpose of operating the pilot-wire relays, rather than restraining the operation thereof.

In the system shown in Fig. 3, when the transmission line 1 is operating under normal power-flow conditions, or under external-fault conditions, with current flowing into the protected line-section at the point where the current-transformers 8 are located, and with practically the same current leaving the protected line-section at the point where the current-transformers 43 are located, or vice versa, the limited-voltage output-circuits 52 of the line-current-responsive HCB networks at the respective ends of the protected line-section are reversed with respect to each other, as indicated by the reversed connections 105 in the pilot wires 42', so that no current is circulated over the pilot wires under these conditions.

A changed connection of the pilot-wire relays 57' is also utilized in Fig. 3, the 4,000-turn coils 56' being utilized as the restraint-coils R, and the 500-turn coils 58' being utilized as the operating coils O, instead of the other way around, as in Figs. 1 and 2. The coils 56' are still connected across the pilot wires 42', while the coils 58' are still connected in series therewith.

The operation is such that current has to be circulated over the pilot wires 42', in Fig. 3, in order to energize the operating coils 58' or O, so as to effect a response of the pilot-wire relays 57'. During an internal-fault condition occurring on that portion of the transmission line 1 between the current-transformers 8 and 43, a tripping current is circulated over the pilot wires 42' so that the operating coils 58' or O are energized, whereas the pilot-wire voltage applied to the restraining coils 56' or R falls substantially to zero, so that a relay-operation is effected.

In accordance with the form of my invention which is shown in Fig. 3, the WL relay 84, which is responsive to faults within the power-flow control-unit 6 at station A, is provided with an auxiliary make-contact 106 which is utilized to short-circuit the pilot wire 42', thus short-circuiting both of the restraint-windings 56' or R of the two pilot-wire relays 57' at stations A and B, respectively. The pilot-wire relay 57' at the other end of the pilot wire 42', that is, at the station B, will thus respond, provided that line-current of tripping magnitude is circulated in the line-current transformer 43 as a result of fault-current being fed into a fault in the power-flow control-unit 6 at the station A.

In both Figs. 2 and 3, the relay-contact 59' of the pilot-wire relay 57 or 57' at station A is shown, by way of example, with a connection which is slightly different from that which is shown in Fig. 1, although either connection might be utilized. In Figs. 2 and 3, the pilot-wire relay-contact 59' at station A is utilized to directly energize the trip-circuit 88 at said station A, rather than to energize the WL relay 84 as shown in Fig. 1. Since the pilot-wire relays 57 or 57' do not normally respond, except to an internal line-fault between the current-transformers 8 and 43, the operation of the system is substantially the same, whichever way the relay-contact 59' is connected.

Certain broad features, and other applications, of the means for open-circuiting or short-circuiting the pilot wires in order to affect the tripping-conditions at the other end are described and claimed in a copending application of R. M. Smith and myself, Serial No. 361,398, filed October 16, 1940, patented March 10, 1942, Patent No. 2,276,068, for Pilot-channel protective relaying systems.

While I have described my invention in connection with several particular forms of embodiment which at present appear to be preferable, I wish it to be understood that my invention is not limited to any particular form of embodiment, and that changes may be made, by way of substitutions, additions or alterations, by those skilled in the art, without departing from the essential spirit of my invention. I desire, therefore, that the appended claims shall be accorded the broadest construction consistent with their language.

I claim as my invention:

1. In combination, a protected alternating-current line, line-current-responsive means at each of two spaced points in the line, each of said line-current-responsive means deriving an alternating-current electrical quantity responsive to the line-current at its own point in the line, means for providing a signalling channel between said two spaced points in the line, line-fault-responsive relaying-means for utilizing said signalling channel to comparatively respond to the two derived quantities from said two spaced points for protecting the line against internal faults between said two spaced points while normally avoiding a response to faults occurring elsewhere on the line, said signalling-channel means being of a type which circulates signalling-channel current from said two derived quantities when line-current is flowing into the protected line-section at one of said two spaced points and out at the other, or vice versa, a contiguous line-fault-responsive relaying-means responsive to faults in a second portion of the line contiguous to, but outside of, the signalling-channel-protected portion between the aforesaid two spaced points, and means responsive to said contiguous line-fault-responsive relaying-means for in effect substantially open-circuiting said signalling channel.

2. In combination, a protected alternating-current line, line-current-responsive means at each of two spaced points in the line, each of said line-current-responsive means deriving an alternating-current electrical quantity responsive to the line-current at its own point in the line, means for providing a signalling channel between said two spaced points in the line, line-fault-responsive relaying-means for utilizing said signalling channel to comparatively respond to the two derived quantities from said two spaced points for protecting the line against internal faults between said two spaced points while normally avoiding a response to faults occurring elsewhere on the line, said signalling-channel means being of a type which circulates signalling-channel current from said two derived quantities when there is an internal line-fault between said two spaced points, a contiguous line-fault-responsive relaying-means responsive to faults in a second portion of the line contiguous to, but outside of, the signalling-channel-protected portion between the aforesaid two spaced points, and means responsive to said contiguous line-fault-responsive relaying-means for in effect substantially short-circuiting said signalling channel.

3. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, line-fault-responsive relaying-means for responding to the totalized quantities, means for circulating a direct current of a predetermined magnitude through said pilot wire, means for, at times, producing an intelligence-communicating predetermined alteration in the magnitude of said circulating direct current, and direct-current relaying-means for providing a plurality of different responses to different changes in the magnitude of the circulating direct current, at least one of said responses being a supervisory response to a fault-condition on the pilot wire whereby the pilot wire may be supervised for faulty conditions, and at least one other of said responses being an intelligence-responsive response to said predetermined alteration in the magnitude of said circulating direct current, said predetermined alteration being sufficiently different, in some distinguishable characteristic, from the change in magnitude produced by said fault-condition on the pilot wire to provide for discrimination between a faulty-pilot-wire change in magnitude and a predetermined, intelligence-communicating change in magnitude.

4. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, line-fault-responsive relaying-means for responding to the totalized quantities, means for circulating a direct current of a predetermined magnitude through said pilot wire, means for, at times, producing an intelligence-communicating predetermined alteration in the magnitude of said circulating direct current, and direct-current relaying-means for providing a plurality of different responses to different changes in the magnitude of the circulating direct current, at least one of said responses being a supervisory response to a fault-condition on the pilot wire whereby the pilot wire may be supervised for faulty-conditions, and at least one other of said responses being an intelligence-responsive response to said predetermined alteration in the magnitude of said circulating direct current, said predetermined alteration being of such nature that it does not, in general, cause said supervisory response of said direct-current relaying-means.

5. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, line-fault-responsive relaying means for responding to the totalized quantities, means for circulating a direct current of a predetermined magnitude through said pilot wire, means for, at times, producing an intelligence-communicating predetermined alteration in the magnitude of said circulating direct current, and direct-current relaying-means for providing a plurality of different responses to different changes in the magnitude of the circulating direct current, at least one of said responses being a supervisory response to a fault-condition on the pilot wire whereby the pilot wire may be supervised for faulty conditions, and at least one other of said responses being an intelligence-responsive response to said predetermined alteration in the magnitude of said circulating direct current, said predetermined alteration being sufficiently different, in some distinguishable characteristic, from the change in magnitude produced by said fault-condition on the pilot wire to insure that the change induced by said pilot-wire fault-condition does not, in general, cause said intelligence-responsive response of said direct-current relaying-means.

6. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-fault-responsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing an intelligence-responsive response to said predetermined alteration in the magnitude of said circulating direct current, said predetermined alteration being sufficiently different, in some distinguishable characteristic, from the change in magnitude produced by said fault-condition on the pilot wire to provide for discrimination between a faulty-pilot-wire change in magnitude and a predetermined, intelligence-communicating change in magnitude, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

7. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-fault-responsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing a plurality of different responses to different changes in the magnitude of the circulating direct current, at least one of said responses being a supervisory response to a fault-condition on the pilot wire whereby the pilot wire may be supervised for faulty conditions, and at least one other of said responses being an intelligence-responsive response to said predetermined alteration in the magnitude of said circulating direct current, said predetermined alteration being sufficiently different, in some distinguishable characteristic, from the change in magnitude produced by said fault-condition on the pilot wire to provide for discrimination between a faulty-pilot-wire change in magnitude and a predetermined, intelligence-communicating change in magnitude, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

8. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-fault-responsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing an intelligence-responsive response to said predetermined alteration in the magnitude of said circulating direct current, said predetermined alteration being of such nature that it does not, in general, cause said supervisory response of said direct-current relaying-means, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

9. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-fault-responsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing a plurality of different responses to different changes in the magnitude of the circulating direct current, at least one of said responses being a supervisory response to a fault-condition on the pilot wire whereby the pilot wire may be supervised for faulty conditions, and at least one other of said responses being an intelligence-responsive response to said predetermined alteration in the magnitude of said circulating direct current, said predetermined alteration being of such nature that it does not, in general, cause said supervisory response of said direct-current relaying-means, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

10. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-fault-responsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing an intelligence-responsive response to said predetermined alteration in the magnitude of said circulating direct current, said predetermined alteration being sufficiently different, in some distinguishable characteristic, from the change in magnitude produced by said fault-condition on the pilot wire to insure that the change induced by said pilot-wire fault-condition does not, in general, cause said intelligence-responsive response of said direct-current relaying-means, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

11. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, a line-faultresponsive relaying-means at each end of the pilot wire each responding to the totalized quantities, means for circulating a direct current of a predetermined magnitude through said pilot wire, a line-fault-responsive means at a first end of the protected line-section for responding to predetermined line-fault conditions at said end of the protected line-section independently of the conditions at the second end, means responsive to said first-end line-fault-responsive means for producing an intelligence-communicating alteration in the magnitude of said circulating direct current, direct-current supervisory relaying-means at the first end of the pilot wire for responding to a change in the circulating direct current which is caused by a pilot-wire fault-condition, direct-current relaying means at the second end of the pilot wire for providing a plurality of different responses to different changes in the magnitude of the circulating direct current, at least one of said responses being a supervisory response to a fault-condition on the pilot wire whereby the pilot wire may be supervised for faulty conditions, and at least one other of said responses being an intelligence-responsive response to said predetermined alteration in the magnitude of said circulating direct current, said predetermined alteration being sufficiently different, in some distinguishable characteristic, from the change in magnitude produced by said fault-condition on the pilot wire to insure that the change induced by said pilot-wire fault-condition does not, in general, cause said intelligence-responsive response of said direct-current relaying-means, a line-protective means at each end of the protected line-section for performing a line-segregating operation at its end in response, in some measure, to the totalized-quantity-responsive means at that end of the protected line-section, and a supplementary line-protective means at the second end of the protected line-section for performing a line-segregating operation at that end in response, in some measure, to the intelligence-responsive response of the direct-current relaying-means at said second end of the pilot wire.

12. In combination, a protected alternating-current line-section, line-segregating circuit-interrupting means associated with each end of the protected line-section, a localized line-fault-responsive means in the vicinity of a first end of the protected line-section for responding to predetermined fault-conditions in a first portion of the line-section in the vicinity of said end, a pilot wire extending between said first portion of the line-section and a second portion which is in the vicinity of the second end of the protected line-section, line-current-responsive means at each of said first and second portions of the protected line-section each deriving an alternating-current electrical quantity responsive to the line-current at its own portion of the line-section, electrical-connection means for utilizing the pilot wire to totalize the derived electrical quantities from the respective ends, a line-fault-responsive relaying-means at each end of the pilot wire each effecting a line-segregating operation of its associated circuit-interrupting means in response, in some measure, to the totalized quantites of the pilot wire, means for circulating a direct current of a predetermined magnitude through said pilot wire, means responsive to the aforesaid localized line-fault-responsive means at said first end for producing an intelligence-communicating predetermined alteration in the magnitude of said circulating direct current, supplementary direct-current relaying-means in the vicinity of the second end of the protected line-section for effecting a line-segregating operation of its associated circuit-interrupting means in response, in some measure, to said intelligence-communicating predetermined alteration in the magnitude of said circulating direct current, and supplementary means in the vicinity of the first end of the protected line-section for effecting a line-segregating operation of its associated circuit-interrupting means in response, in some measure, to said localized line-fault-responsive means.

13. In combination, a protected alternating-current line-section, line-segregating circuit-interrupting means associated with each end of the protected line-section, a power-translating means connected to the protected line-section somewhere between the two circuit-interrupting means, a localized line-fault-responsive means for responding to predetermined fault-conditions somewhere between a first circuit-interrupting means at a first end of the protected line-section and a first portion of the protected line-section located at the further side of the power-translating means so that said power-translating means is included in the response of said localized line-fault-responsive means, a pilot wire extending between said first portion of the line-section and a second portion which is in the vicinity of the second circuit-interrupting means at the second end of the protected line-section, line-current-responsive means at each of said first and second portions of the protected line-section each deriving an alternating-current electrical quantity responsive to the line-current at its own portion of the line-section, electrical-connection means for utilizing the pilot wire to totalize the derived electrical quantites from the respective ends, a line-fault-responsive relaying-means at each end of the pilot wire each effecting a line-segregating operation of its associated circuit-interrupting means in response, in some measure, to the totalized quantities of the pilot wire, means for circulating a direct current of a predetermined magnitude through said pilot wire, means responsive to the aforesaid localized line-fault-responsive means at said first end for producing an intelligence-communicating predetermined alteration in the magnitude of said circulating direct current, supplementary direct-current relaying-means in the vicinity of the second end of the protected line-section for effecting a line-segregating operation of its associated circuit-interrupting means in response, in some measure, to said intelligence-communicating predetermined alteration in the magnitude of said circulating direct current, and supplementary means in the vicinity of the first end of the protected line-section for effecting a line-segregating operation of its associated circuit-interrupting means in response, in some measure, to said localized line-fault-responsive means.

14. In combination, a protected alternating-current line-section, a pilot wire between the ends thereof, line-current-responsive means associated with each end of the pilot wire each deriving an alternating-current electrical quantity responsive to the line-current at its own end of the line-section, electrical-connection means for utilizing the pilot wire to totalize the derived electrical quantities from the respective ends, line-fault-responsive relaying means for responding to the totalized quantities, means for circulating a direct current of a predetermined magnitude through said pilot wire, said last-mentioned means including a transformer having a primary circuit and a secondary circuit, a capacitor in the primary circuit having a capacitance coordinated with the reactance of the transformer, a rectifier in the secondary circuit for supplying a circulating direct current to said pilot wire, and means for, at times, changing the effective value of the serially included capacitance in the primary circuit for producing an intelligence-communicating predetermined alteration in the magnitude of said circulating direct current, and direct-current relaying-means for providing an intelligence-responsive response to said predetermined alteration in the magnitude of said circulating direct current.

15. In combination, a pilot wire extending between two spaced points, means, including a direct-current source at a first end of the pilot wire, for circulating a direct current of a predetermined magnitude through said pilot wire, said source including a transformer having a primary circuit and a secondary circuit, a capacitor in the primary circuit having a capacitance coordinated with the reactance of the transformer, a rectifier in the secondary circuit for supplying a circulating direct current to said pilot wire, and means for, at times, changing the effective value of the serially included capacitance in the primary circuit for producing an intelligence-communicating predetermined alteration in the magnitude of said circulating direct current, and direct-current relaying-means for providing an intelligence responsive response to said predetermined alteration in the magnitude of said circulating direct current.

16. In combination, a power line including an electric translating apparatus adjacent one end thereof, circuit-interrupting means at each end of said line, fault-responsive protective means for said translating apparatus to cause operation of the circuit-interrupting means adjacent thereto, a pilot-wire protective system including a pair of pilot wires connected between the ends of said line arranged to cause tripping of both of said circuit-interrupting means upon the occurrence of a fault on said line, means for continuously indicating the condition of said pilot wires, and means including said last-mentioned means for causing tripping of said interrupting means remote from said translating apparatus when said first mentioned protective means causes operation of said adjacent circuit-interrupting means.

17. In combination, a line section including a power transformer adjacent one end thereof, circuit-interrupting means at each end of said line section for isolating said line section upon the occurrence of a fault condition thereon, a differential protective system for said power transformer arranged to cause operation of the circuit-interrupting means adjacent said transformer whenever a fault condition occurs on said transformer, a protective system for said line section for controlling said circuit-interrupting means at each end thereof including a relaying station adjacent each circuit-interrupting means interconnected by a pair of pilot wires, a supervisory system for said pilot wires comprising means for impressing a unidirectional current thereon, means for preventing said unidirectional current from interfering with the operation of said relaying stations, an alarm means at each end of said line section arranged to be operated in response to substantial variations in the flow of said unidirectional current caused either by breaking or short circuiting of said pilot wires, means for causing operation of said circuit interrupting means remote from said transformer in response to a substantial increase in unidirectional current flowing in said pilot wires adjacent said remote end of said line section, and means for causing a substantial increase in the unidirectional current flowing in said pilot wires in response to operation of said differential protective means.

18. In combination, a power line including circuit-interrupting means at each end thereof, a pilot wire protective system including a pair of pilot wires connected between the ends of said line and arranged to cause tripping of both of said circuit-interrupting means upon the occurrence of a fault on said line, an additional fault-responsive protective system for controlling one of said circuit-interrupting means under certain predetermined conditions, means for continuously indicating the condition of said pilot wires, and means including said last-mentioned means for causing tripping of the other of said circuit-interrupting means when said additional fault-responsive protective system causes operation of said one circuit-interrupting means.

19. In combination, a power line including circuit-interrupting means at each end thereof, a pilot wire protective system including a pair of pilot wires connected between the ends of said line and arranged to cause tripping of both of said circuit-interrupting means upon the occurrence of a fault on said line, an additional fault-responsive protective system for controlling one of said circuit-interrupting means under certain predetermined conditions, means for continuously indicating the condition of said pilot wires including means for impressing a unidirectional current thereon, an alarm means at each end of said power line arranged to be operated in response to substantial variations in the flow of said unidirectional current caused either by breaking or short-circuiting of said pilot wires, means for causing operation of said other circuit-interrupting means in response to a substantial increase in unidirectional current flowing in said pilot wires adjacent said other circuit-interrupting means, and means for causing such substantial increase in the unidirectional current flowing in said pilot wires in response to operation of said additional fault-responsive protective system.

MYRON A. BOSTWICK.